Figure 1:
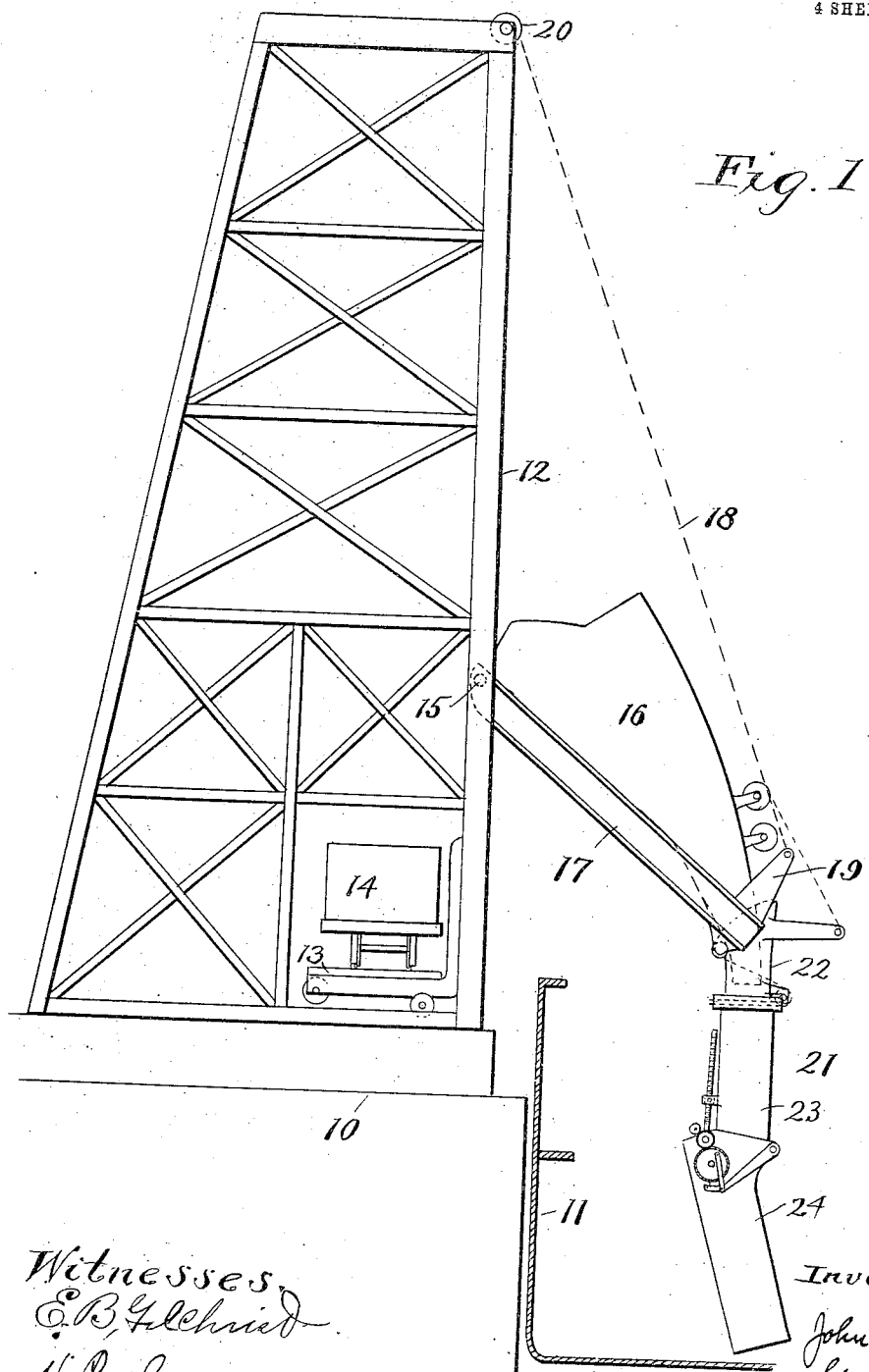

J. McMYLER.
LOADING APPARATUS.
APPLICATION FILED MAY 26, 1910.

1,046,624.

Patented Dec. 10, 1912.
4 SHEETS—SHEET 1.

Witnesses
E. B. Gilchrist
H. B. Sullivan

Inventor
John McMyler
by
Thurston & Kwis
attys.

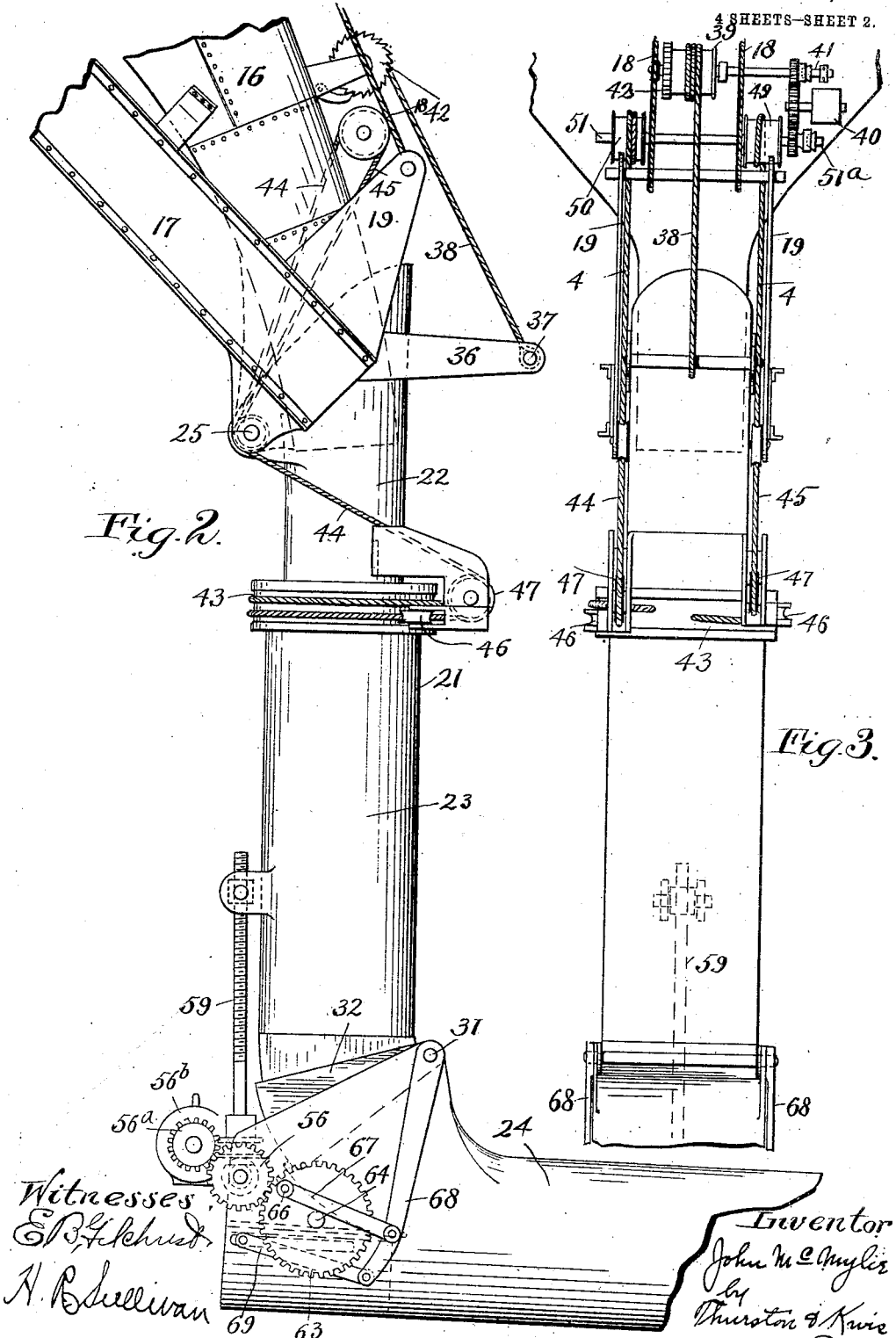

J. McMYLER.
LOADING APPARATUS.
APPLICATION FILED MAY 26, 1910.

1,046,624.

Patented Dec. 10, 1912.
4 SHEETS—SHEET 3.

Witnesses.
E. B. Gilchrist
H. B. Sullivan.

Inventor
John McMyler
by
Thurston & Kwis
attys.

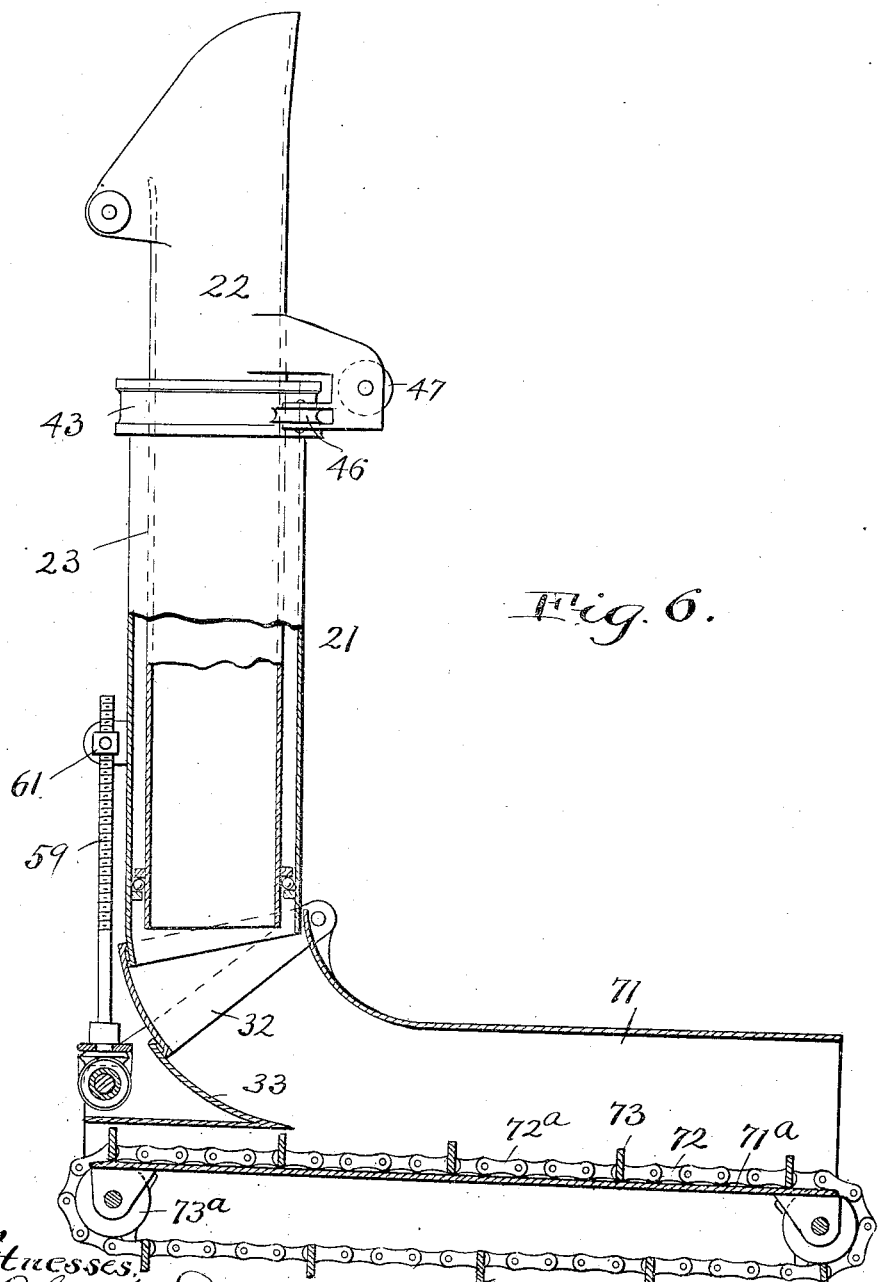

UNITED STATES PATENT OFFICE.

JOHN McMYLER, OF CLEVELAND, OHIO, ASSIGNOR TO THE McMYLER MANUFACTURING COMPANY, OF CLEVELAND, OHIO, A CORPORATION OF OHIO.

LOADING APPARATUS.

1,046,624. Specification of Letters Patent. Patented Dec. 10, 1912.

Application filed May 26, 1910. Serial No. 563,486.

*To all whom it may concern:*

Be it known that I, JOHN McMYLER, a citizen of the United States, residing at Cleveland, in the county of Cuyahoga and State of Ohio, have invented a certain new and useful Improvement in Loading Apparatus, of which the following is a full, clear, and exact description.

This invention relates to loading apparatus and particularly to the so-called trimmers which are utilized for loading vessels with coal and like material which can be discharged through a chute or spout into the hold of the vessel.

The object of the invention is to provide a trimmer or loading apparatus, which permits the material to be distributed uniformly and evenly over the hold of the vessel or other member to be loaded, and which can be easily operated and is under perfect control of the operator so that the discharging member can be shifted about in all directions and to all required positions to secure the desired uniform distribution.

A further object is to provide a trimmer which is more efficient in time required to load a vessel, in manner of loading, and ease of operation, and is less expensive to install and operate than the apparatus used heretofore.

These and other objects are attained by my invention which in the preferred embodiment includes a hopper which may be supported on a frame of a car dumping apparatus and has attached to the lower end thereof a chute which is designed to be lowered into the hold or hatchway of a vessel, and preferably consists of joints or sections connected and movable in such a manner that the discharge end of the chute may be shifted about so as to discharge the material which is dumped into the hopper in any part of the hatchway.

Preferably, the hopper is pivotally connected to the supporting frame so that the hopper, as well as the discharging and distributing chute may be swung as a unit upwardly or downwardly to permit the chute to be raised clear of the vessel or to be lowered at any depth into a hatchway. Any suitable mechanism operated by an electric motor or other motive device may be employed for raising or lowering the hopper and chute.

The chute, as before stated, consists of sections, at least three of which are preferably provided, and when the chute consists of three sections, in the preferred embodiment of my invention the upper section is pivotally connected to the hopper at a point adjacent the lower end thereof, the middle section is arranged concentrically with respect to the upper section and is swiveled upon the same so that it and the lower section may be turned or swung horizontally, about the axis of the upper section, and the lower section is pivoted to the middle section so that it may be raised and lowered with respect thereto, suitable operating mechanism under the control of the operator being provided so that the sections of the chute may be turned or swung in any desired manner to fill the vessel uniformly.

When the lowermost section is in certain positions with respect to the middle section, the material dumped into the hopper may fall by gravity through the chute and be discharged therefrom, but when the lowermost section, which is capable of swinging from substantially a vertical position to substantially a horizontal position, is raised to a position such that material will not fall by gravity through the chute or through the lowermost section, the material may be forced through the same by a feeding device, which, in the combination, forms an important feature of my invention. This feeding device may be in the form of a reciprocating member, such as a motor operated plunger, or it may be in the form of an endless conveyer, either of which can be thrown into operation when necessary, so as to feed the material along and through the lowermost section.

The above and other novel features of my invention will be explained in the following detail description.

Figures 4, 5:
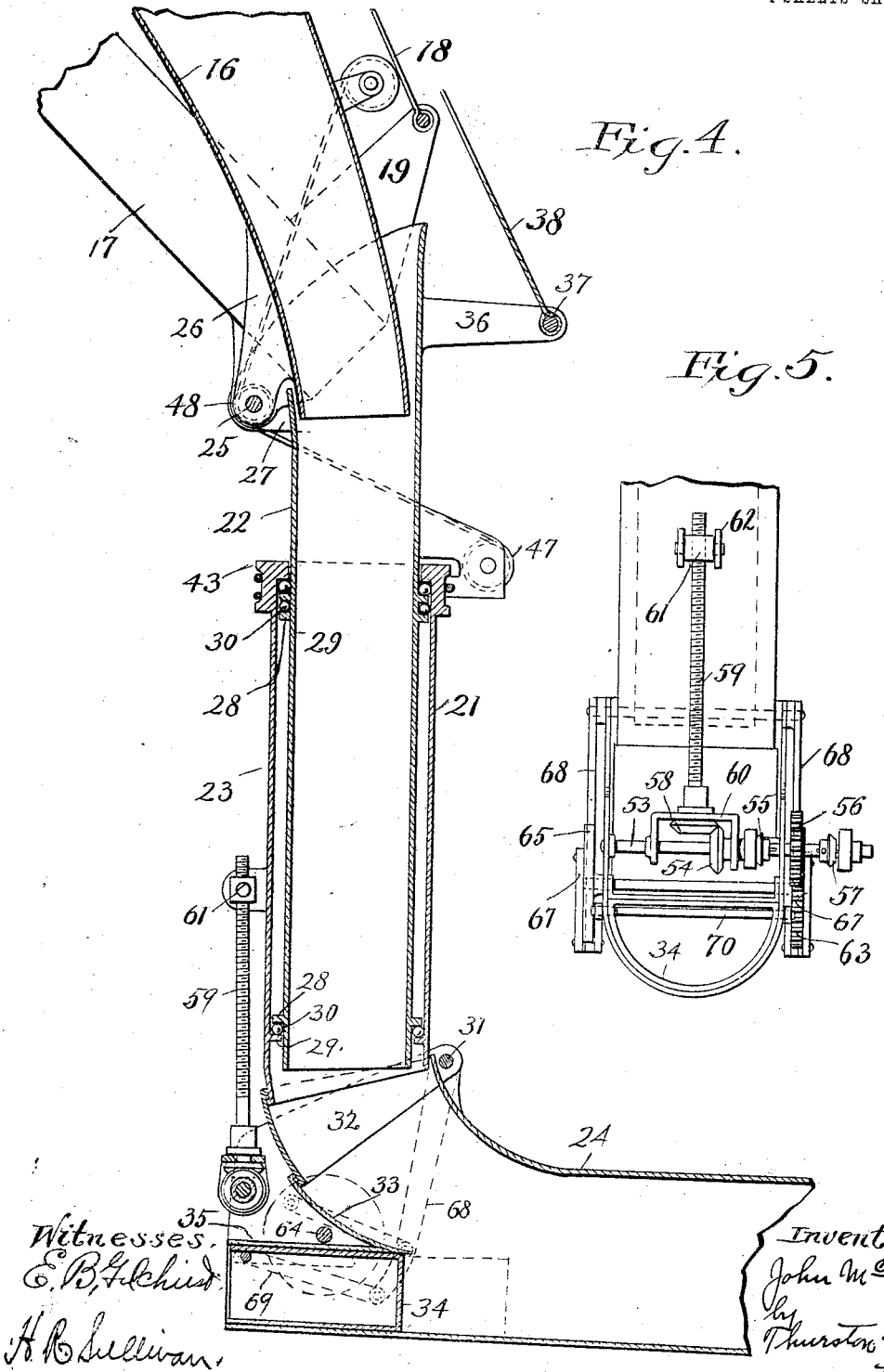

In the accompanying sheets of drawings, Figure 1 is a side elevation of my improved trimmer or loading apparatus shown in operative position with respect to a dock and a vessel, the vessel being shown in section; Fig. 2 is an enlarged side elevation of the lower portion of the hopper and a portion of the chute, the lower section of the latter being arranged in substantially horizontal position; Fig. 3 is a front view of the same; Fig. 4 is a vertical sectional elevation of the same; Fig. 5 is a rear view of a portion of the middle and lowermost sections of the chute, this view showing particularly the mechanism for raising and lowering the lowermost section with respect to the middle section, and the mechanism for operating the feeding device which, in this and in the preceding views, is in the form of a plunger, the motor being omitted for the sake of clearness; and Fig. 6 is a partial sectional view showing a modification of the feeding mechanism.

Referring now to the figures of the drawing, 10 represents a suitable dock along which is a vessel 11 adapted to be loaded by my improved trimmer or loading apparatus. On the dock is a frame or structure 12, in this case, of a car dumping apparatus, having means such as an elevator 13 for hoisting a car 14, which is loaded with the material to be transferred to the vessel 11 and which may be dumped by any suitable mechanism. This car dumping mechanism does not form part of the present invention, and is not here shown. Pivotally supported at 15, at any suitable height above the dock 10 is a hopper 16 which may be formed of sheet metal, or of any other material, and is provided with a large open inlet end of sufficient size that a carload of coal or other material, may be readily dumped into the hopper, and is contracted or tapered toward its lower end, which, as shown in Figs. 2, 3 and 4, is annular or cylindrical. This hopper may be braced and strengthened in any desired manner, such as by structural members shown at 17, and it may be raised and lowered by means of one or more cables 18, each of which is connected to arms 19 extending upwardly from the members 17, and passes about a sheave 20 supported at the top of the frame 12 and may then extend to any suitable winding mechanism (not shown) including an engine or motive device which will be under control of the operator so that the chute connected to the hopper may be raised from or lowered into a hatchway of the vessel or gradually raised as the hatchway becomes filled.

Pivotally connected at the lower end of the hopper is a chute 21 which in the present case consists of three main sections, an upper section 22, a middle section 23, and a lower or end section 24. The lower end of the hopper extends down into the mouth or upper end of the section 22, which is pivotally supported from the hopper so that the entire chute may be swung backward or forward with respect thereto. In this case, the chute is pivoted to the hopper by means of a pivotal supporting rod 25 which extends through suitable ears 26 on the lower rear part of the hopper and ears 27 on the upper rear part of the section 22 of the chute. The mechanism for shifting the chute about the pivotal support 25 will be explained presently.

The middle section 23 of the chute, in as shown most clearly in Fig. 4 arranged concentrically with respect to the section 22, and is swiveled thereon so that it may be turned about the same. In the present case, the supporting and swiveling means for the section 23 consists of external flanges 28, on the section 22, internal flanges 29, on the section 23, and series of ball bearings 30 between the flanges. These flanges and ball bearings therefore constitute anti-friction step and thrust bearings.

The lowermost or end section 24 of the chute is pivotally supported from the middle section 23 so that the former may be swung upwardly or downwardly with respect to the latter. In this case the section 24 is supported from the middle section 23 by means of a pivotal supporting rod 31 extending through suitable ears projecting forwardly from the lower end of the section 23, and forwardly projecting ears at the upper rear end of the section 24. As is apparent from Fig. 4, these two sections 23 and 24 are connected together by a telescopic joint formed by the lower end of the section 23 which is slightly concaved as shown, by a separate joint section 32 which is pivotally supported on the rod 31, and by a curved plate 33 which is secured to and extends between the sides of the rear part of section 24. This separate joint section 32 is designed to slide over the lower curved part of the section 23 and the plate 33 is designed to slide over the joint section 32, so that although the section 24 of the chute is adapted to be swung through an arc of substantially 90° with respect to the section 23, this flexible and telescopic joint accommodates this movement and provides a close fitting tight joint which prevents the leakage of material at any time. At the same time, the parts of the joint being curved, as shown, the material discharged through the inner and upper section 22, will be gradually deflected into the section 24.

It will be seen that when the section 24 is in a horizontal position or nearly in that position, the material will not pass freely therethrough. In order that the material may be discharged through the chute regardless of the position of the lowermost section, I have provided a feeding device which may be thrown into operation when it is necessary that the material be fed mechanically through said section. In the preferred form of my invention, this mechanical feeding device consists of a reciprocating plunger 34, which, as shown most clearly in Figs. 4 and 5 is substantially semi-cylindrical in shape. This plunger 34 is arranged below the curved plate 33 forming part of the joint connecting the sections 23 and 24, and is below a flat plate 35 extending between the rear portion of the section 24, the side walls at this point being substantially parallel, as shown in Fig. 5. This plate 35, together with the rounded lower rear part of the section 24 of the chute constitute a casing in which the plunger is adapted to operate. It will be seen particularly from Fig. 4 that when the section 24 is in a position such that the material can not fall by gravity through the same, the material falling through the inner and uppermost section 22 will strike the curved plate 33, be deflected, and will drop into the section 24 in front of the plunger 34, which if reciprocated, will feed the material forwardly and out of this section 24.

The mechanism for turning or swinging the different sections of the chute relative to the hopper, and relative to each other, and for operating the plunger will now be explained. The movements of the sections of the chute, of the plunger, and of the hopper may be controlled by an operator who may be located at a suitable station which may be supported in any suitable manner from the hopper, preferably directly over the vessel so that the operator can observe the action of the trimmer and the loading of the vessel, but this operator's station, I have not shown, to avoid complicating the drawings and description.

To raise and lower or swing the entire chute with reference to the hopper, forwardly projecting arms 36 are provided at the upper end of the section 22, and these arms are connected by a rod 37 to which is attached a cable 38 which passes about a drum 39 mounted on a shaft which may be supported in any suitable manner from the hopper, and may be operated by means of a motive device, such as an electric motor 40 and gearing which may be thrown into driving relation therewith by means of a clutch 41. To hold the chute in any desired position with reference to the hopper a ratchet 42 may be provided at one end of the drum. Thus, by turning this drum by means of the motor, the operation of which can be controlled from the operator's station, the entire chute can be swung about the pivotal supporting rod 25 so as to swing the lower end of the chute backwardly or forwardly along the hatchway of the vessel.

The sections 23 and 24 of the chute may be turned horizontally or laterally with reference to the section 22 so as to swing the discharge end of the chute across the hatchway by different mechanisms, but in this case I have shown the following mechanism. At the upper end of section 23 of the chute is a sheave 43 which is engaged by two cables 44 and 45 passing about the sheave in opposite directions and each dead-ended thereon. These cables pass about suitable sheaves 46 and 47 which are supported on the front of the section 23 adjacent the sheave 43, thence about sheaves 48 which are mounted upon the pivotal supporting rod 25 between the ears on the hopper and on the section 22, and thence these cables pass in opposite directions about a pair of drums 49 and 50 mounted upon a shaft 51, which may be driven through suitable gears by the motor 40 previously referred to. A suitable clutch 51ª which may be shifted by the operator from his station is provided for forming or breaking the driving connection between the motor and the shaft 51. When this shaft 51 and drums 49 and 50 are turned in one direction by the motor which preferably will be of the reversible type, the sheave 43, and consequently the middle and lowermost sections 23 and 24 will be turned in one direction with reference to the section 22 and hopper, and when this shaft 51 and drums 49 and 50 are turned in the opposite direction by the motor, the sections 23 and 24 will be turned in the opposite direction.

The mechanism for raising and lowering the section 24 of the chute with reference to the section 23, and for operating the plunger will now be explained. Extending between the parallel side walls of the upper or rear portion of the section 24, and journaled in said side walls in suitable bearings carried thereby is a short shaft 53 which is provided with a bevel gear 54 normally loose on the shaft, but capable of being clutched thereto by means of a clutch 55. The shaft 53 is provided also with a spur gear 56 which is loose on the shaft, but may be clutched thereto by a clutch 57. This gear is engaged and adapted to be driven by a gear 56ª of a motor 56ᵇ. The bevel gear 54 meshes with a bevel gear 58 which is fixed to the lower end of a threaded shaft 59 which extends substantially vertically along the rear side of the middle section 23 of the chute, the gear 58 and shaft 59 being held in proper position relative to the gear 54 by means of a bracket 60, and this shaft 59 engages a nut 61 which is pivotally supported by a pair of ears 62 extending rearwardly from the middle chute section 23. The pinion 56 meshes with a gear 63 which is mounted upon a shaft 64 extending between the side walls of the rear part of the chute section 24 just above the plate 35 previously referred to. This gear 63 and a suitable wheel or disk 65 at the opposite end of the shaft 64 are provided with eccentrically arranged pins 66 which are connected by links 67 to a pair of arms 68 arranged on opposite sides of the chute, these arms being pivotally supported at their upper ends upon the pivotal supporting rod 31 for the chute section 24, and being connected at their lower ends to links 69, the rear ends of which are connected by a rod 70 passing through the rear part of the plunger 34 and passing loosely through elongated slots in the opposite side walls of the upper rear part of the chute section 24. Thus when the bevel gear 54 is clutched to the shaft 53, and the motor 56[b] is in operation, the shaft 59 will be rotated, and by the engagement of this shaft with the nut 61 carried by the chute section 23, the chute section 24 will be raised or lowered with respect to the section 23. When the gear 56 is clutched to the shaft 53, the plunger will be reciprocated by the mechanism previously described. The plunger may be operated independently or simultaneously with the raising or lowering of the chute section 24 by throwing in one clutch or the other, or throwing them both in simultaneously. These clutches 55 and 57 may be operated from the operator's station in any suitable manner, but I prefer to employ for this purpose magnetic clutches which can be easily operated from a remote point.

In Fig. 6 I have shown a slight modification in the shape of the lowermost section of the chute and in the mechanism for feeding the material therethrough. In this case, the chute section which is shown at 71, is substantially semi-cylindrical in shape, having a flat bottom 71[a]. The material is adapted to be fed through this section when the latter is at an angle such that the material will not fall by gravity therethrough, by means of an endless conveyer 72, the upper leg of which is adapted to be moved forwardly over the bottom 71[a], and the lower leg rearwardly under the bottom. This conveyer may be formed of a pair of endless sprocket chains 72[a] and by transverse feeding or conveying plates 73 which are attached to and extend across the chains at intervals. The chains engage two sets of sprocket wheels 73[a] mounted on two shafts, one at the forward end of the chute section and one at the rear end thereof. If desired, one of the shafts may be adjustably mounted, for the purpose of adjusting the tension of the sprocket chains. This conveyer may be driven by a motor which can be controlled by the operator from his station.

In the use of the trimmer above described, when the vessel to be loaded is in the proper position, the hopper and chute will be lowered so that the chute extends well into the hatchway, as shown in Fig. 1. Inasmuch as the entire chute can be swung back and forth, and as the lowermost section can be swung from a substantially vertical position to a substantially horizontal position without interfering with the discharge of material therethrough, and as this section can be swung laterally to any desired position, it will be apparent that the material can be distributed uniformly about the hatchway and can be deposited in any part of the latter, such as under the hatch coamings.

When one hatchway is filled, the hopper and chute will be swung upwardly until the chute is clear of the vessel which will then be shifted so that the chute can be lowered into another hatchway.

Having thus described my invention, what I claim is:

1. In a loading apparatus, a hopper, a delivery chute arranged beneath the hopper and adapted to receive material therefrom, said chute comprising an upper section connected to the hopper, a second section supported by and arranged concentrically with respect to and movable about the axis of the first named section, and a third and delivery section pivotally connected to said second named section, means for mechanically feeding material through said delivery section, and devices for tilting the delivery section, for turning the delivery section and the second named section about the axis of the first named section, and for operating the feeding means.

2. In a loading apparatus, a hopper, a chute pivotally supported on the lower end of the hopper structure and capable of swinging movement with reference thereto, said chute comprising an upper section which receives material from the hopper, a section which is supported by and arranged concentrically with respect to the first named section and is movable about the axis of the same, and a third section which is pivotally supported on said second named section, means for mechanically feeding material through said third section, and devices for swinging the chute as a unit about its pivotal support, for turning the second and third named sections about the axis of the first named section, for raising or lowering the third named section, and for operating the feeding means.

3. In a loading apparatus, a frame or supporting structure, a hopper pivotally supported thereon, a chute pivotally supported adjacent the lower end of the hopper and adapted to receive material therefrom, said chute comprising an upper section connected to the hopper, a middle section which is supported by and arranged concentrically with respect to the upper section and is adapted to be moved about the axis of the same, and a third section pivotally supported on the middle section, means for mechanically feeding material through said third section, and devices for swinging the hopper and chute as a unit about the pivotal support of the hopper, for swinging the chute as a unit about its pivotal support, for turning the middle section and the third section about the axis of the upper section, and for swinging the third section about its pivotal support.

4. In a loading apparatus, a supporting frame or structure, a hopper pivotally connected thereto, a chute at the lower end of the hopper comprising an upper or receiving section pivotally supported from the hopper, a lowermost or discharge section, and a member which is arranged concentrically about and is swiveled to the uppermost section and pivotally supports the lowermost section, said lowermost section having means for mechanically feeding material through the same, and devices for swinging the hopper and chute about the axis of the hopper, for swinging the chute about the pivotal axis of the uppermost section, for swinging the lowermost section laterally, and for swinging it vertically.

5. In a loading apparatus, a hopper into which material is adapted to be dumped, a chute at the lower end of the hopper adapted to receive the material therefrom, said chute comprising a plurality of relatively movable sections, the lowermost section being supported so that it may be raised or lowered, means carried by the lowermost section for feeding material through the same, and a deflector arranged above said feeding device.

6. In a loading apparatus, a supporting frame or structure, a hopper pivotally connected thereto, a chute pivotally connected to the lower portion of the hopper and comprising a plurality of sections including an upper section connected to the hopper, a second section swiveled upon the upper section and movable about the axis of the latter, and a mechanical feeding device located beneath the said two sections of the chute and pivoted to the said swiveled section so that the feeding device may be turned laterally or may be swung about its pivotal axis, and devices for swinging the hopper and chute as a unit about the pivotal axis of the hopper, for swinging the chute as a unit about the pivotal axis of the uppermost section, for turning the feeding device laterally and for swinging the latter vertically.

7. In a loading apparatus, a hopper, a chute at the lower end of the hopper comprising an upper section below the chute, a pivoted delivery section at the lower end of the chute, an intermediate member swiveled for turning movement and supporting the lowermost section, and a telescopic joint connecting said intermediate member and delivery section.

In testimony whereof, I hereunto affix my signature in the presence of two witnesses.

JOHN McMYLER.

Witnesses:
H. R. SULLIVAN,
A. F. KWIS.